Aug. 11, 1964     H. T. CAMPBELL ETAL     3,144,168
APPARATUS FOR CONTINUOUSLY FEEDING ARTICLES TO MACHINES
Filed Dec. 8, 1961     4 Sheets-Sheet 3

INVENTORS
H.T. CAMPBELL
J.J. MONAHAN
J.A. ROEDER

By *W.D. Johnson*
ATTORNEY

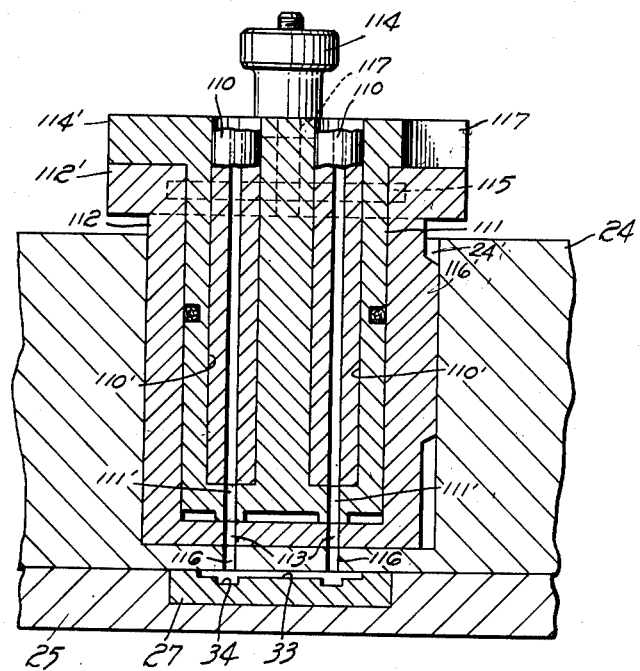

3,144,168
APPARATUS FOR CONTINUOUSLY FEEDING
ARTICLES TO MACHINES
Hobart T. Campbell and Jack J. Monahan, Allentown, and Joseph A. Roeder, Quakertown, Pa., assignors to Western Electric Company, Incorporated, New York, N.Y., a corporation of New York
Filed Dec. 8, 1961, Ser. No. 158,080
2 Claims. (Cl. 221—11)

This invention relates to apparatus for continuously feeding articles to machines, particularly to nests of turret type machines.

In the manufacture of certain types of components such as varistors, it is important that the small wafer-like articles be located accurately with respect to the lengths of wires which are to be their leads. In the present instance, a machine of the turret type, as shown in applicants' co-pending application, Serial No. 157,965, filed December 8, 1961, is provided with radially positioned nests into which the lengths of wires and the pairs of wafers may be received in their respective orders and supported for assembly. For the machine to operate most efficiently, it is important that the articles or wafers be fed to the nests during every interval of rest of the turret at the feeding station and that it not be necessary to stop the machine due to an exhausted supply of articles.

It is, therefore, the object of this invention to provide an article feeding apparatus which, although simple in structure, is highly efficient in continuously feeding articles during successive time intervals to nests therefor.

According to the object, the invention comprises an apparatus for continuously feeding articles successively at a feeding station to nests moved intermittently into said station. The apparatus includes spaced feeding units operable singly and each provided with a supply of articles and associated mechanisms so that when the supply of one unit is exhausted, means will be operated to move another unit into feeding position.

Other objects and advantages will be apparent from the following detailed description when considered in conjunction with the accompanying drawings wherein:

FIG. 6 is an enlarged vertical sectional view taken along the line 6—6 of FIG. 5.

Figure 1:
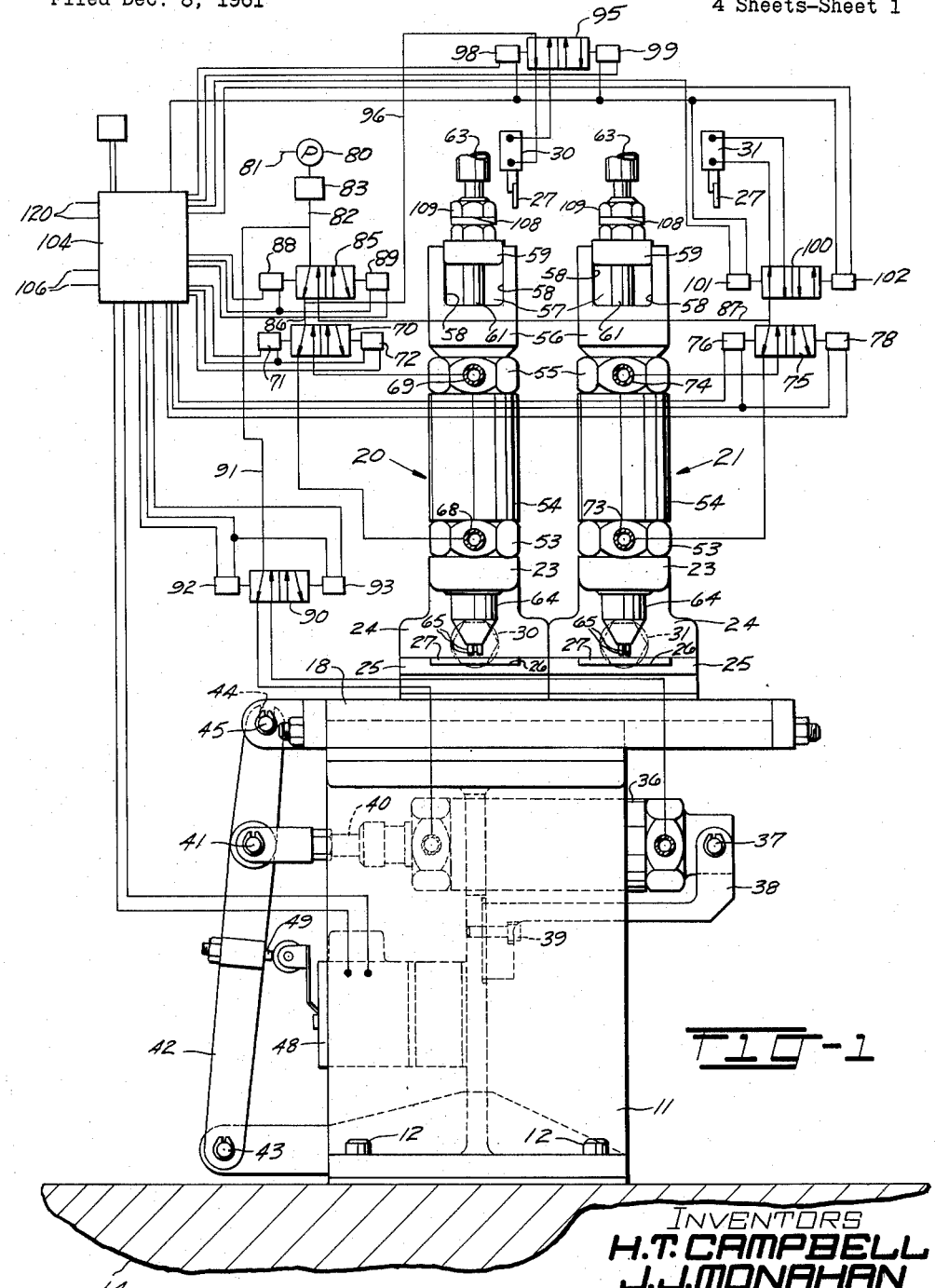
FIG. 1 is a front elevational view of the apparatus, illustrating also the electro-pneumatic controls therefor.

The apparatus, indicated generally at 10, includes a support 11 mounted at 12 on a base 14 of a turret type machine 15 having a turret 16 rotated intermittently between intervals of rest to locate nests 17 mounted radially thereon successively into a feeding station.

A carriage 18 is mounted on the support 11 and provided with a dovetail connection 19 therewith so that the carriage may be moved to locate alternately feeding units 20 and 21 in a feeding position for alignment with the nest 17 located in the feeding station. The units 20 and 21 are identical with exception of their positions with respect to the carriage 18. They are supported by brackets 23 which are parts of covers 24 for housings 25. The housings 25 are recessed at 26 for receiving their respective article transfer elements 27 which are fixed at 28 to piston rods 29 of their respective air cylinders, both being shown structurally and schematically at 30 and 31 in FIG. 1.

Figure 4:
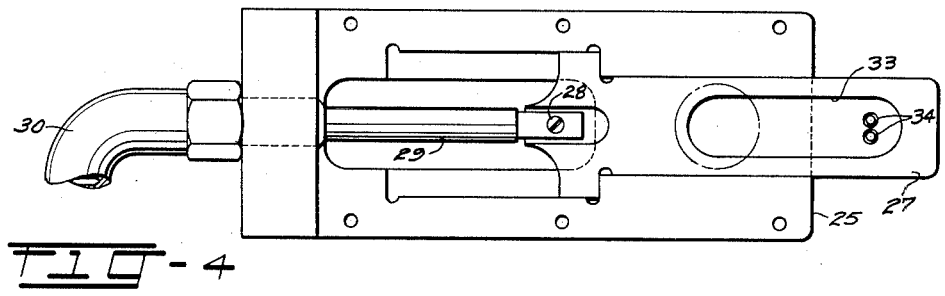
FIG. 4 is a fragmentary top plan view of one of the supply units.
Figure 5:
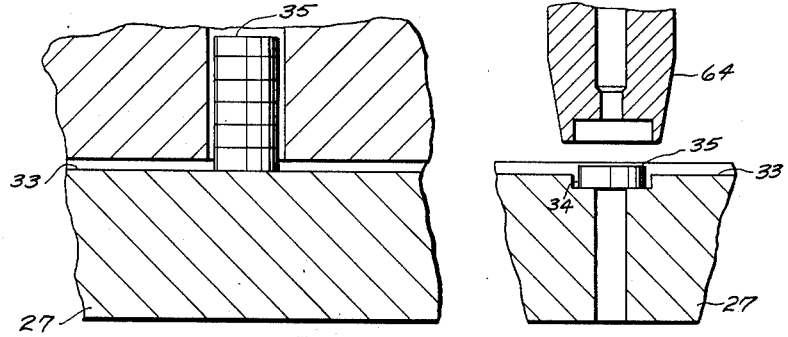
FIG. 5 is an enlarged fragmentary sectional view of a portion of one of the supply units and its feeding unit.

FIG. 4 illustrates one of the transfer elements 27 and its connection with its air cylinder 30 as being provided with a large recessed portion 33 with spaced smaller recesses 34 for receiving the pairs of wafers which are to be fed simultaneously into position to be picked up by its feeding unit 20–21. The relationship of these recesses 33 and 34 is also shown in FIG. 5, the larger recess serving to support stacks of wafers 35 until the smaller recesses 34 are moved into registration therewith, at which time the bottom wafers in each stack will enter the recesses 34 and thereby be removed from the stacks during forward movement or movement to the right of the transfer element 27.

Before continuing with the description of the units 20 and 21, attention is directed to the means for moving the carriage 18 to locate the units alternately in the feeding position. This means includes an air cylinder 36 pivotally supported at 37 on a bracket 38 mounted at 39 on the support 11. A piston rod 40 of the air cylinder 36 is connected pivotally at 41 to a lever 42, the lower end of which is mounted on a fixed position pivot 43, while the upper end is notched at 44 to straddle a pivot pin 45 mounted at the adjacent end of the carriage 18. A switch 48 mounted on the support 11 and operated open by a projection 49 adjustably mounted on the lever 42 enters into the control of the operation of the air cylinder 36.

Figure 2:
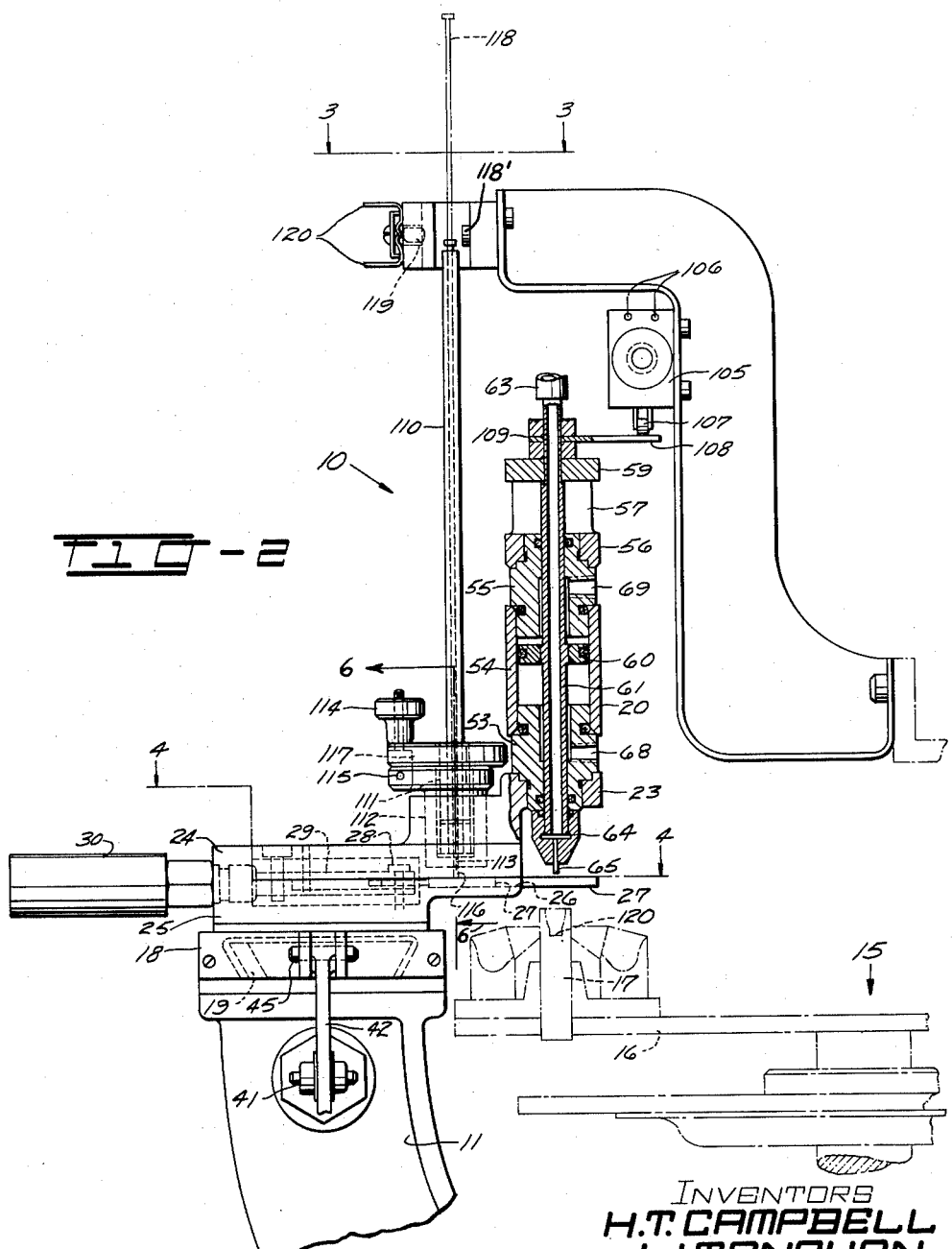
FIG. 2 is a side elevational view of the apparatus.
Figure 3:
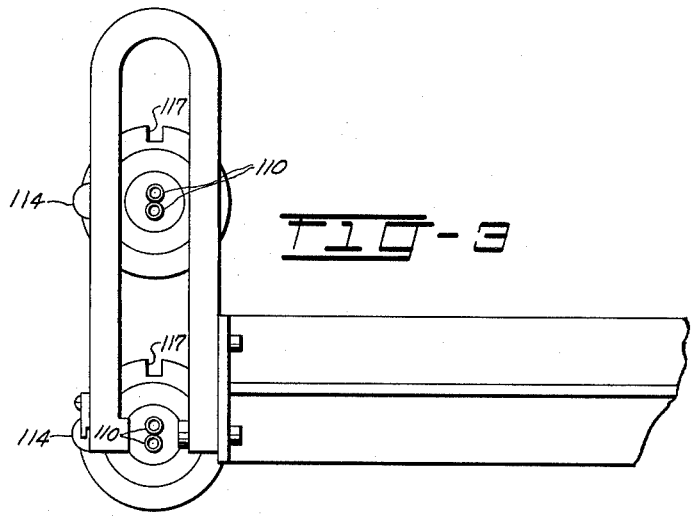
FIG. 3 is a fragmentary top plan view of a portion of the apparatus taken along the line 3—3 of FIG. 2.

As stated heretofore, the units 20 and 21 are identical in structure and are made operative alternately when moved into the feeding position of the feeding station. At present, unit 20 is located in this position and is shown in section in FIG. 2. A portion 53, mounted in the bracket 23, supports the lower end of a cylinder 54, an upper portion 55 being mounted on the upper end of the cylinder 54 and provided with a guide member 56 mounted on the upper end thereof. The guide member has an opening 57 with parallel side walls 58, serving to guide a member 59 in its vertical movement. In the present instance, a piston 60, for the cylinder 54, is mounted on a tube 61 which extends upwardly and downwardly from the piston freely through the members 53 and 55 and fixed to member 59. The tube 61 is connected at its upper end to another tube 63 which is a part of a suction line. The suction created in the line 63 for the tube 61 may be under suitable controls, not shown, to effect picking up and releasing articles such as the wafers 35. A suction head 64 is mounted on the lower end of the tube 61 and is provided with a pair of suction tubes 65, as shown in FIG. 1.

For the purpose of identification, the reference numerals thus far applied to unit 20 are applied also to unit 21. The unit 20 is provided with lower and upper ports 68 and 69, respectively, which are under the control of a valve 70 and its solenoids 71 and 72. The unit 21 has lower and upper ports 73 and 74 in members 53 and 55, respectively, which are under the control of a valve 75 in response to its solenoids 76 and 78.

The main air supply is represented by a pump 80 positioned between a supply line 81 and a main line 82 in which a pressure control valve 83 is disposed.

Due to the fact that the units 20 and 21 must be effective alternately, their valves 70 and 75, in the present illustration, are under the control of a main valve 85 interposed between the main line 82 and their respective lines 86 and 87, the main valve 85 being under the control of solenoids 88 and 89. The air cylinder 36 is under the control of a valve 90 connected to the main line 82 through line 91 and responsive to solenoids 92 and 93. The air cylinder 30 is responsive to a valve 95 which is placed under the control of valve 85, through line 96, connected to line 86 in one illustration to be effective when the unit 20 is effective. The valve 95 is responsive to solenoids 98 and 99. In a similar manner, the air cylinder 31 is under the control of a valve 100 connected to line 87 of the valve 85 and responsive to solenoids 101 and 102.

The electrical controls for the various solenoids are housed in a main control unit 104 and may be of any commercially known means for causing the solenoids to function at their desired intervals, the ony exceptions being in the assistance of the switch 48 which functions with the control unit 104 to condition the control unit for reversing the action of the air cylinder 36 for the carriage 18. Furthermore, a switch 105 is provided for the units 20 and 21 when in the feeding position and is provided with a pair of lines 106 extending to the control unit 104. The switch 105 has a roller type actuator 107 positioned to be engaged by projections 108 fixed at 109 to their tube 61 of units 20 and 21.

The wafers 35 are sorted initially at a position spaced from the machine and the apparatus and are brought to the apparatus in pairs of tubes 110. Each pair of tubes 110 has its lower ends fixedly mounted in apertures 110′ of an inner part 111 of a holder and extend therein. The inner part 111 is rotatable in an outer part 112 of the holder to initially position outlet openings 111′ for the inner part aligned with the lower ends of the tubes 110 out of registration with outlet openings 113 in the bottom of the outer part. A clamp 114, pivoted at 115 to a head 112′ of the outer part 112, may be loosened and moved free of a head 114′ of the inner part to permit movement of the tubes into and out of alignment with the outlet openings 113 of the outer part and openings 116 of the cover 24. The clamp is receivable in either of a pair of notches 117 of the head 114′ of the inner part for these purposes. Suitable means aligns the pair of openings 113 with the pair of openings 116. Each pair of tubes is loaded with wafers 35 at a position spaced from the apparatus with the tubes 110 and their outlet openings 111′ disposed out of alignment with the openings 113 and 116. Each holder and its loaded tubes is placed in the recess of the cover opening in this out-of-line condition. An integral tongue 116′ of the outer part 112 entering a groove 24′ of the recess of the cover assures proper positioning of the outlet openings 113 in registration with the openings 116. Opening of the clamp 114, from one notch 117, movement of the inner part 111 and tubes 110 and closing of the clamp in the other notch 117 aligns the tubes 110 and openings 111′ with openings 113 and 116. Pin-like members are disposed in the tubes 110 and allowed to rest on the top of the stack of wafers in the tubes. Initially, the pins 118 interrupt small beams of light from conventional electric eye lamps 118′ to prevent actuation of electric eyes 119 having leads 120 extending to the main control unit 104. These circuits, under the control of the electric eyes, trigger action of the main control unit 104 to alternate operation of the air cylinder 36, in reverse directions for example, to move the unit 20 out of the feeding position and immediately move the unit 21 into this position, after the supply tubes 110 for the unit 20 have been emptied and the pins 118 moved out of interference with the electric eye allowing it to function.

The functions of electric eyes to trigger electrical circuits in control units are well known in the art. In the present instance there are two electric eyes 119, one for each unit 20 and 21 although only one is shown. It should be understood that while one unit is in the feeding position the electric eye for that unit only can be energized but is held inactive as long as the pin 118 interrupts the light beam from its lamp 118′. When the pin 118 for unit 20 moves below the light beam the electric eye for this unit is activated to close a circuit through solenoid 92 (FIG. 1) to operate valve 90 to operate air cylinder 36 to operate lever 42 to move the carriage 18 to the left to move the unit 20 out of the feeding position and move the unit 21 into the feeding position. While the unit 20 is out of the feeding position the empty pair of tubes 110 may be removed from this unit and a filled pair disposed in their place to condition the unit 20 for its next trip to the feeding position. In the meantime, the unit 21 is supplying wafers and will continue to do so until its pin 118 moves below its light beam from its lamp 118′ to allow the light beam to activate its electric eye 119. This action results in action through the unit 104 to energize solenoid 93 to operate valve 90 to cause air cylinder 36 to move the carriage 18 to move the unit 21 out of and the unit 20 into the feeding position.

*Operation*

Assuming unit 20 is in the feeding position, the valve 85 will be in the position shown to render the unit 20 effective and its associated article transfer means responsive to the action of the air cylinder 30. With the apparatus in this position, it will function through one complete cycle during the rest interval of each nest 17 at the feeding station. This cycle includes the operation of certain valves through their solenoids to cause air cylinder 30 to move from its normal position, with the transfer element 27 located inwardly, as indicated in dotted lines in FIG. 2, where a pair of wafers or articles will be located in the recesses 34. At the start of the cycle, the transfer element is moved to its forward position where it will remain while the unit 20 is operated through one portion of its cycle to move the piston 60 and its tube 61 downwardly a distance sufficient to cause the tubular member 65 to engage and, through suction, pick up the wafers from the recesses 34. Immediately following, the unit 20 functions to move the wafers upwardly free of the transfer member 27 following which the transfer member is returned to its normal position through operation of air cylinder 30.

At this time, the second portion of the operating cycle of the unit 20 is performed to move the piston 60 downwardly to move the tube 61 with its suction head 64, the tubular member 65 and the wafers thereon until the wafers are placed on a wire 120 located in the nest 17. At this time, the suction is cut off, the wafers are allowed to rest in the nest, and the unit 20, particularly the piston 60 and its associated members, is moved upwardly to its normal position. During these upward movements, the associated switch 105 functions to complete circuits of the control unit 104 to bring about, in the first instance, the repeat or the function of the second half of the operating cycle of the unit 20 and, in the second instance, the closing of the operation of the unit 20 until the next nest 17 is moved into the feeding station. These double actions of the unit 20 are responsive to the valve 70 and its controlling solenoids 71 and 72.

This operation continues repeatedly until the stacks of wafers in the tubes 110 are exhausted, or substantially exhausted, at which time, the pins 118 in the tubes 110 will be moved out of the area of the electric eye 119 allowing it to function to trigger the action through the unit 104 and valve 90 for the operation of the air cylinder 36 to cause immediate movement of the carriage 18 to bring the unit 21 into the feeding position.

The unit 21, having been supplied with tubes 110, filled with wafers and supporting controlling pins 118 in the ends thereof, is brought into the area of the electric eye cutting off its function and causing closing of switch 105 allowing the series of actions to take place causing the unit 21, with its associated air cylinder 31, to feed pairs of wafers successively to the nests brought into the feeding station.

The action of the unit 21 continues through its double or partial operating cycles until the pins 118, in the supply tubes 110 thereof, move below the area of the electric eye 119, at which time, a series of controls is triggered through the control unit 104 to cause the air cylinder 36 to function to move the unit 21 and its associated structures out of the feeding position and to again move the unit 20 into this position. Prior to this action, the empty tubes 110 have been removed for the unit 20 and additional tubes, filled with wafers and provided with their control pins 118, have been inserted in place. This makes possible the continuous and uninterrupted feeding of articles, such as wafers, to nests of a machine where the efficiency of the machine depends upon this type of feeding action.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for continuously feeding articles successively to nests moved intermittently into a feeding station comprising:
   a support fixedly mounted at the feeding station,
   a carriage disposed for movement between given positions on the support,
   holders loaded with supplies of articles,
   like spaced units, adapted to receive and support the holders singly, mounted on the carriage and operable alternately in a feeding position to feed articles successively to the nests until the holder for articles at the feeding position is empty,
   each empty holder being removable from its unit when away from the feeding position and replaced by a loaded holder,
   means operable alternately to move the carriage in reverse directions to move each unit out of the feeding position when its holder for articles is empty and move the other unit with its loaded holder into the feeding position to continuously feed articles successively to the nests,
   a transfer element for each unit mounted in the carriage for movement therein relative to its unit,
   means for each transfer element operable when in the feeding position to cause movement of the transfer element between a normal position and a projected position to receive articles successively from the holder at the normal position and locate the articles successively beneath the unit at the projected position.
   the holders having outer parts with outlets for the articles open to their transfer elements,
   inner parts movably disposed in the outer parts and having outlets for the articles,
   tubes for holding the articles in stacked formation having their lower end mounted in the inner parts in registration with the outlets thereof, and
   means to locate the inner parts in first positions with the tubes and outlets of the inner parts out of registration with the outlets of the outer parts and in second positions with the respective tubes and outlets aligned.

2. An apparatus for continuously feeding articles successively to nests moved intermittently into a feeding station comprising:
   a support fixedly mounted at the feeding station,
   a carriage disposed for movement between given positions on the support,
   holders loaded with supplies of articles,
   like spaced units, adapted to receive and support the holders singly, mounted on the carriage and operable alternately in a feeding position to feed articles successively to the nests until the holder for articles at the feeding position is empty,
   each empty holder being removable from its unit when away from the feeding position and replaced by a loaded holder,
   means operable alternately to move the carriage in reverse directions to move each unit out of the feeding position when its holder for articles is empty and move the other unit with its loaded holder into the feeding position to continuously feed articles successively to the nests,
   a transfer element for each unit mounted in the carriage for movement therein relative to its unit,
   means for each transfer element operable when in the feeding position to cause movement of the transfer element between a normal position and a projected position to receive articles successively from the holder at the normal position and locate the articles successively beneath the unit at the projected position.
   the holders having outer parts with outlets for the articles open to their transfer elements,
   inner parts movably disposed in the outer parts and having outlets for the articles,
   tubes for holding the articles in stacked formation having their lower end mounted in the inner parts in registration with the outlets thereof,
   means to locate the inner parts in first positions with the tubes and outlets of the inner parts out of registration with the outlets of the outer parts and in second positions with the respective tubes and outlets aligned, and
   a clamp for each holder actuable into open and closed positions to secure the inner parts in the first positions until the holder is mounted on the carriage and subsequently secure the inner parts in the second positions.

References Cited in the file of this patent
UNITED STATES PATENTS

| | | |
|---|---|---|
| 708,083 | Schell | Sept. 2, 1902 |
| 2,294,274 | Buxbaum | Aug. 25, 1942 |
| 2,325,165 | Goodwin | July 27, 1943 |
| 2,385,521 | Mead | Sept. 25, 1945 |
| 2,407,968 | Von Stoeser | Sept. 17, 1946 |
| 2,652,931 | Hughes | Sept. 22, 1953 |